US009224362B2

(12) United States Patent
Klaus et al.

(10) Patent No.: US 9,224,362 B2
(45) Date of Patent: Dec. 29, 2015

(54) MONOCHROMATIC EDGE GEOMETRY RECONSTRUCTION THROUGH ACHROMATIC GUIDANCE

(71) Applicant: Microsoft Technology Licensing, LLC, Redmond, WA (US)

(72) Inventors: Andreas Klaus, Graz (AT); Konrad Karner, Graz (AT); Martin Ponticelli, Graz (AT); Christian Neuner, Graz (AT); Helfried Tschemmernegg, Eibiswald (AT); Stefan Bernogger, Graz (AT)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 13/830,908

(22) Filed: Mar. 14, 2013

(65) Prior Publication Data

US 2014/0267351 A1 Sep. 18, 2014

(51) Int. Cl.
*G09G 5/00* (2006.01)
*G09G 5/02* (2006.01)
*G06T 15/00* (2011.01)
(Continued)

(52) U.S. Cl.
CPC .. *G09G 5/02* (2013.01); *G06T 5/40* (2013.01); *G06T 15/005* (2013.01)

(58) Field of Classification Search
USPC ......... 345/418–419, 428, 586, 589, 606, 611, 345/643, 501, 629, 630, 505, 506; 382/254, 382/260, 274, 276, 300; 708/290, 300, 490
See application file for complete search history.

(56) References Cited

U.S. PATENT DOCUMENTS 5,357,353 A * 10/1994 Hirota ........................... 358/530
5,357,354 A * 10/1994 Matsunawa et al. .......... 358/530
6,108,036 A *  8/2000 Harada et al. .............. 348/219.1
(Continued)

OTHER PUBLICATIONS

Malvar, Henrique., et al.; "High-Quality Linear Interpolation for Demosaicing of Bayer-Patterned Color Images". In Proceedings of IEEE International Conference on Acoustics, Speech and Signal Processing. http://ieeexplore.ieee.org/stamp/stamp.jsp?tp=&arnumber=1326587 Published Date: May 17, 2004 pp. 1-4.
(Continued)

*Primary Examiner* — Wesner Sajous
(74) *Attorney, Agent, or Firm* — Danielle Johnston-Holmes; Steven Spellman; Micky Minhas

(57) ABSTRACT

Many imaging scenarios involve an achromatic image (e.g., a panchromatic image or a near-infrared image) and one or more concurrently captured monochromatic images (e.g., RGB images captured through a Bayer filter array), and the compositing of these images through de-mosaicing and/or pan-sharpening to generate a high-resolution color image. However, in many such scenarios, the monochromatic images may exhibit distortion of edge geometry, resulting in artifacts and/or color distortions near visual edges of the composite image. However, such distortions may be absent from the achromatic image, and edge geometry may be represented as an intensity gradient among respective neighborhoods of achromatic pixels. Presented herein are techniques for reducing such distortions in monochromatic images through iterative adjustment of monochromatic pixel intensity to reflect the gradients of the neighborhoods of the corresponding achromatic pixels. Convergence of such adjustments produces composite images exhibiting accurately reconstructed edge geometry.

20 Claims, 7 Drawing Sheets

(51) Int. Cl.
   *G06T 3/40*        (2006.01)
   *G06T 5/40*        (2006.01)

(56) References Cited

U.S. PATENT DOCUMENTS

| | | | |
|---|---|---|---|
| 7,502,505 | B2 | 3/2009 | Malvar |
| 7,643,676 | B2 | 1/2010 | Malvar |
| 7,646,910 | B1 | 1/2010 | Linzer |
| 7,706,609 | B2 | 4/2010 | Bennett |
| 7,889,921 | B2 | 2/2011 | Morales |
| 8,098,294 | B2 | 1/2012 | Nashizawa |
| 8,098,964 | B2 | 1/2012 | Kasperkiewicz et al. |
| 8,165,389 | B2 | 4/2012 | Malvar |
| 8,224,085 | B2 | 7/2012 | Morales |
| 8,229,212 | B2 | 7/2012 | Siddiqui |
| 2005/0200733 | A1 | 9/2005 | Malvar |
| 2005/0201616 | A1 | 9/2005 | Malvar |
| 2006/0088298 | A1* | 4/2006 | Frame et al. ............... 386/117 |
| 2006/0284872 | A1* | 12/2006 | Brown Elliott ............. 345/426 |
| 2007/0177033 | A1 | 8/2007 | Bennett |
| 2008/0240559 | A1 | 10/2008 | Malvar |
| 2010/0254597 | A1* | 10/2010 | Yen et al. .................... 382/164 |
| 2011/0122223 | A1 | 5/2011 | Gruber |
| 2011/0122300 | A1 | 5/2011 | Gruber |
| 2012/0224789 | A1 | 9/2012 | Chatterjee |

OTHER PUBLICATIONS

Ramanath, Rajeev., et al.; "Demosaicking Methods for Bayer Color Arrays". In Journal of Electronic Imaging, vol. 11, Issue 3. http://www.ece.ncsu.edu/imaging/Publications/2002/demosaicking-JEI-02.pdf Published Date: Jul. 2002 pp. 1-10.

Gunturk, Bahadir., et al.; "Color Plane Interpolation Using Alternating Projections". In Proceedings of IEEE Transactions on Image Processing. vol. 11, Issue 9. http://ieeexplore.ieee.org/stamp/stamp.jsp?tp=&arnumber=1036049 Published Date: Sep. 2002. pp. 1-17.

Hirakawa, Keigo., et al.; "Adaptive Homogeneity-Directed Demosaicing Algorithm". In Proceedings of IEEE Transaction on Image Processing. vol. 14, Issue 3. http://ieeexplore.ieee.org/stamp/stamp.jsp?tp=&arnumber=1395991 Published Date: Mar. 2005. pp. 1-10.

Chaix de Lavarene, Brice., et al.; "Practical Implementation of LMMSE Demosaicing Using Luminance and Chrominance Spaces". http://hal.univ-savoie.fr/docs/00/15/77/08/PDF/chaix2007.pdf Published Date: Jul. 2007. pp. 1-21.

Bennett, Eric., et al.; "Video and Image Bayesian Demosaicing with a Two Color Image Prior". In Proceedings of the 9th European Conference on Computer Vision. vol. Part 1. http://ultra.sdk.free.fr/docs/Image-Processing/Demosaic/Video%20and%20Image%20Bayesian%20Demosaicing%20with%20a%20Two%20Color%20Image%20Prior.pdf Published Date: May 7, 2006. pp. 1-14.

* cited by examiner

MONOCHROMATIC EDGE GEOMETRY RECONSTRUCTION THROUGH ACHROMATIC GUIDANCE

BACKGROUND

Within the field of imaging, many scenarios involve the generation of a composite image using a set of monochromatic images, such as images captured by respective image sensors respectively positioned behind red, green, and blue color filters of a Bayer filter array. In many such scenarios, the pixels of respective input monochromatic images may represent a mosaic, and each (achromatic) pixel of a composite image may be generated through a "de-mosaicing" calculation based on the set of corresponding monochromatic pixels in approximately the same position of the monochromatic images. However, many such techniques may result in chromatic inaccuracies or artifacts, as the reconstruction of the captured color of each composite pixel from the mosaic of captured monochromatic images may not precisely and accurately reflect the relevant portion of the visible spectrum.

In addition, many such scenarios also involve an input achromatic image captured through a different image sensor, such as a panchromatic image captured by an unfiltered image sensor that captures a large range of the achromatic spectrum, or an infrared or near-infrared image captured by an image sensor positioned behind an infrared-passing or near-infrared-passing filter. As a first example, the inclusion of achromatic pixels of the achromatic image with the corresponding monochromatic pixels may facilitate accurate per-pixel color reconstruction. For example, the luminance of a panchromatic pixel may be compared with the composite luminance of the respective monochromatic pixels, and a proportional scaling may be applied to adjust the intensity of the monochromatic pixels to match the luminance of the panchromatic pixel. As a second example, the monochromatic image may be captured with a higher resolution than the monochromatic images. A pan-sharpening technique may be utilized to combine the color data from the lower-resolution monochromatic images and the higher resolution of the monochromatic image to produce a high-resolution, color composite image. As a third example, in some types of imaging, an achromatic image may capture particular types of information that are not fully captured by the monochromatic images. For example, in aerial photography, infrared and near-infrared images may more accurately reflect edge detail of trees and bodies of water than monochromatic images, and the composite image may result in more accurate edge detail for such objects. For these and other reasons, many cameras and image processing techniques may utilize a combination of monochromatic and achromatic images to generate composite images having various advantageous properties.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A particular feature of monochromatic imaging that may significantly affect the quality of a composite image generated through de-mosaicing and/or pan-sharpening is a subtle loss of geometry among the objects captured through monochromatic filters. For example, the particular shapes, orientation, and alignment of edges may be distorted by the linear interpolation involved in composite image generation techniques. The resulting composite images may exhibit various forms of visual artifacts around the edges, such as Moiré patterns and color inaccuracies. However, such inaccuracies may not be present in achromatic images. Additionally, such edge detail may be exhibited by gradients among neighboring pixels in the achromatic image. Adjusting the pixels of the monochromatic images to according to gradients among neighboring pixels of the achromatic image, may produce a composite image exhibiting reduced the edge geometry distortion from the monochromatic images.

Presented herein are techniques for generating a composite image from a set of monochromatic images and an achromatic image that reflect a reconstruction of edge geometry, higher chromatic accuracy, and a reduction of visual artifacts. In accordance with these techniques, the pixels of the monochromatic images may be subjected to an adjustment of the monochromatic pixels to reflect a gradient exhibited in the corresponding pixel and neighboring pixels (e.g., a 3×3 grid) of the achromatic image. Additionally, such adjustment may be performed iteratively, incrementally adjusting the monochromatic pixels to reflect the gradient of the achromatic pixels, until a convergence of the adjustment is achieved. The present disclosure provides several variations in such techniques, as well as mathematical formulae expressing particular calculations that may enable a suitable iterative adjustment in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
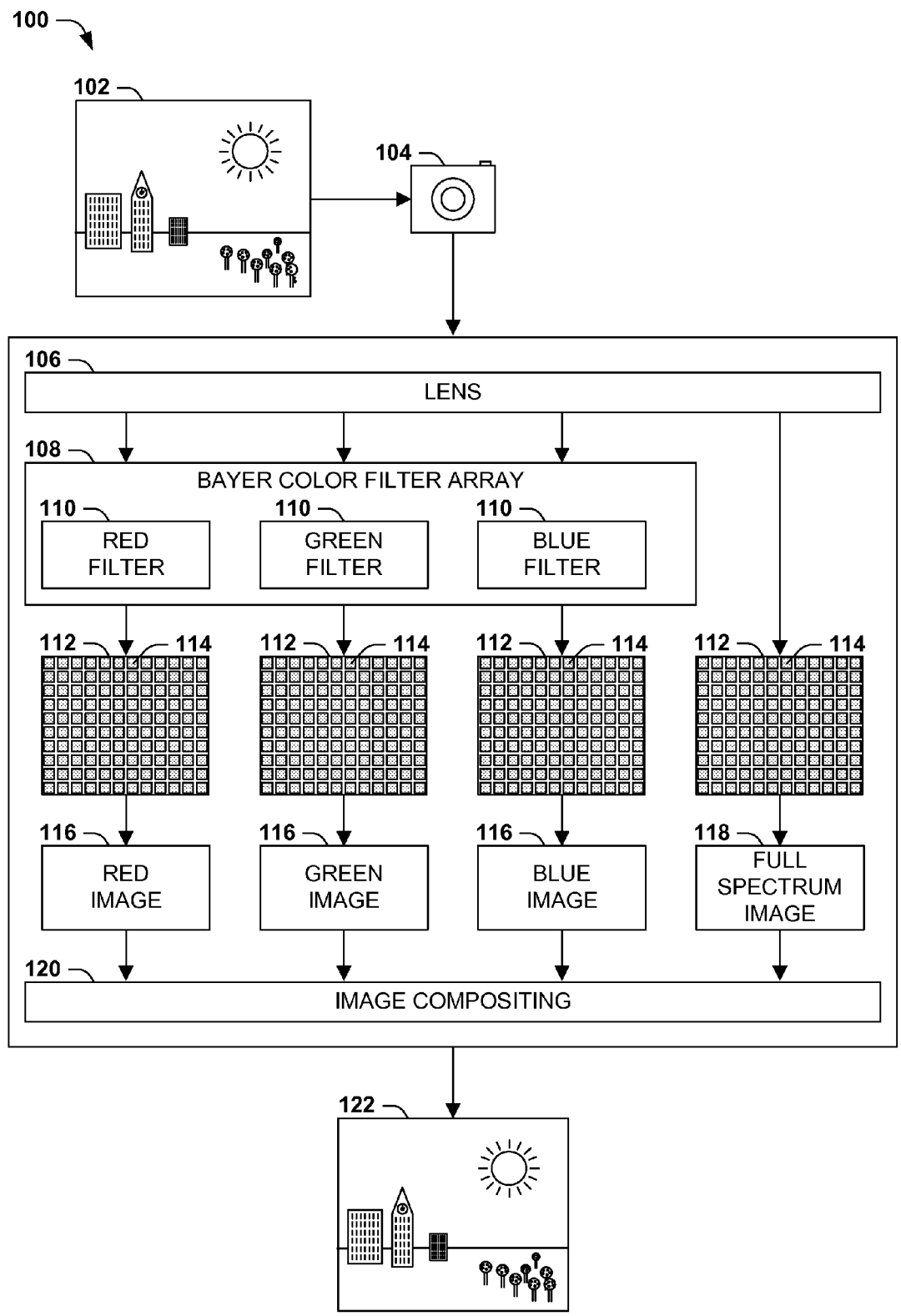
FIG. 1 is an illustration of an exemplary scenario featuring a composite image of a scene generated from a set of monochromatic images and an achromatic image.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of imaging, many scenarios involve the generation of a composite image from a set of monochromatic images. For example, many cameras comprise a series of image sensors respectively positioned behind a color filter that transmits light within a particular narrow monochromatic range, and a compositing component that combines the color data from the monochromatic images to generate a full-color composite image. In particular, for each pixel of the composite image, such cameras may capture a "mosaic" of monochromatic pixels, such as a grid or cluster of nearby monochromatic pixels, and may "de-mosaic" the cluster to produce the full-color pixel of the composite image.

Moreover, many such scenarios may also supplement the compositing with a different type of image. As a first example, a camera may include a panchromatic image that captures light across the visible spectrum (e.g., an image sensor not positioned behind a chromatic filter), and the compositing may factor the pixels of the panchromatic image into the compositing. For example, the monochromatic pixels, factored together, may unevenly and/or incompletely reflect the full range of visible light intensities. The camera may reduce inaccuracies in the intensity of respective composite pixels by comparing the sum of the intensities of the monochromatic pixels and the intensity of the corresponding panchromatic pixel, and proportionally scaling the monochromatic pixel intensities to equalize this comparison. As a second example, in some types of imaging (such as aerial photography), particular image details may not be fully captured by the particular monochromatic images, such as the edges of trees and/or bodies of water. Therefore, the camera may also capture an infrared or near-infrared image that more accurately captures such details, and the compositing of each pixel in the composite image may factor in the corresponding infrared or near-infrared pixel in addition to the monochromatic pixels. As a third example, some cameras may include monochromatic image sensors that capture comparatively low-resolution images, and a panchromatic image sensor that captures a high-resolution image (e.g., in order to reduce the cost or data volume of the monochromatic image sensors), since chrominance resolution may be less noticeable or significant for image quality than luminance resolution. Accordingly, various compositing techniques ("pan-sharpening" techniques) may involve factoring together the respective and corresponding low-resolution pixels of the monochromatic images to calculate the color for more than one pixel of the panchromatic image to generate a high-resolution, full-color composite image.

FIG. 1 presents an illustration of an exemplary scenario 100 involving a capturing of a scene 102 with a camera 104 that is configured to generate a composite image 122 composited from a set of monochromatic images 116 and an achromatic image 118. In this exemplary scenario 100, when oriented toward the scene 102, the camera 104 receives light from the scene 102 through a lens 106 and focuses such light on a set of image sensors 112, each comprising an array of photosensitive elements 114 that respectively sample the intensity of light and generate an intensity value representing a pixel of the corresponding image. Moreover, respective image sensors 112 generate different types of images that are factored together to generate the composite image 122. For example, the camera 104 includes a Bayer color filter array 108, wherein respective image sensors 112 are positioned behind a monochromatic filter 110 (e.g., a red filter, a green filter, and a blue filter), and produce a monochromatic image 116 based only on the intensities of the filtered range of the visible spectrum. Additionally, the camera 104 includes a fourth image sensor 112 that is not positioned behind a monochromatic filter 110 (e.g., the camera 104 may include no filter, or may include achromatic filters, such as light polarizers that reduce glare), and that captures an achromatic image 118 and generates a grayscale composite image, where each pixel reflects the total intensity of the full spectrum of visible light. Having concurrently captured three chromatic images 116 and one achromatic image 118 of the scene 102, the camera 104 perform an image compositing 120 that calculates each pixel of the composite image 122 from the corresponding pixel of each monochromatic image 116 and the achromatic image 118. In this manner, the camera 104 may produce a full-color composite image 122 with additional image quality properties (e.g., brightness, contrast, color accuracy, and/or resolution) achieved by also factoring in the achromatic image 118.

B. Presented Techniques

As illustrated in the exemplary scenario 100 of FIG. 1, many cameras 104 may be configured to utilize a variety of image sensors 112 to capture monochromatic images 116 and one or more achromatic images 118, and may composite the images in order to enhance properties such as color accuracy, brightness, edge contrast, and/or resolution.

However, one property that many such techniques may not adequately address is a distortion of edge geometry of monochromatic images 116. In imaging, because the contrast of visual edges may be reflected more significantly in luminance than chrominance, a composite image 122 composited from monochromatic images 116 may not accurately reflect the geometry of visual edges within the scene 102, and linear interpolation techniques for reconstructing the image of the scene 102 may therefore inaccurately reflect some details of such edges, including the shape, orientation, and/or alignment of such edges. The resulting composite image 122 may therefore exhibit some visual artifacts around the edges, such as a subtle mottling or speckling of color along visual edges within the composite image 122.

Figure 2:
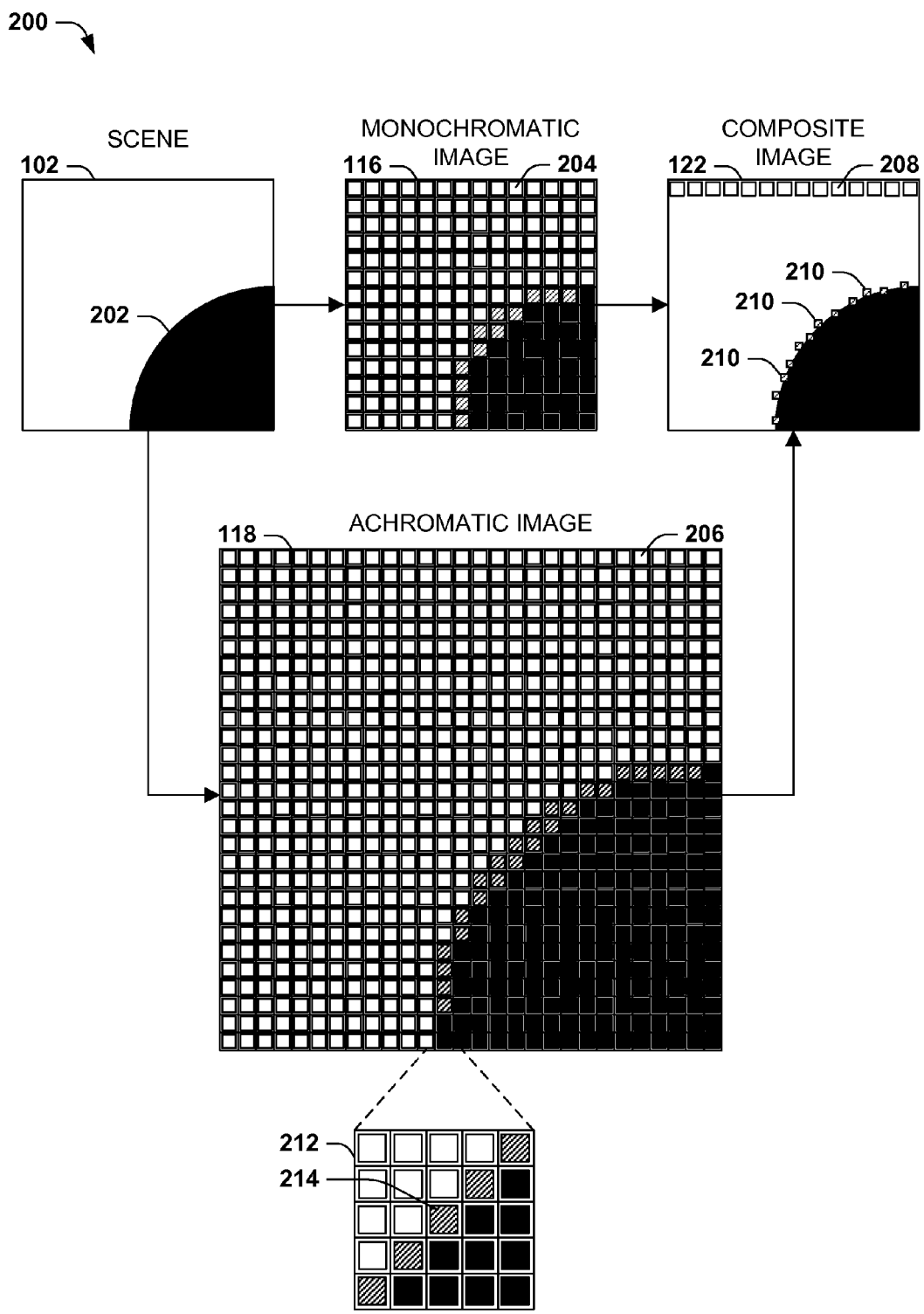
FIG. 2 is an illustration of an exemplary scenario featuring a compositing of a composite image of a scene from a set of monochromatic images and an achromatic image.

FIG. 2 presents an illustration of an exemplary scenario 200 featuring a capturing of a scene 102 as a set of several monochromatic images 116 (only one of which is depicted in FIG. 2) and an achromatic image 118, and the generation of a composite image 122 where each composite pixel 208 is computed by factoring together the corresponding monochromatic pixel 204 of each monochromatic image 116 and the achromatic pixel 206 of the achromatic image 118. As further illustrated in this exemplary scenario 200, the scene 102 includes an edge 202 of an object, such as a curve of a ball. In the monochromatic image 116, respective monochromatic pixels 204 may not accurately reflect the geometry of the edge 202, because the intensity contrast between such values may have a lower magnitude in this chrominance channel than in an achromatic luminance channel. These inaccuracies may be exacerbated in cameras 104 featuring a lower-resolution monochromatic image sensor 112. Accordingly, the monochromatic pixels 204 comprising the monochromatic image 116 may present a subtle inaccuracy or distortion along the edge 202 within the scene 102. Similar inaccuracies may arise along the edges 202 of the other monochromatic images 116 for similar reasons, such that the composite image 122 composited from the monochromatic images 116 may reflect visual artifacts 210 along the edge 202, which may appear as speckling, noise, a geometric distortion, and/or a mottling of color along the edge 202 in the composite image 122.

It may further be noted that an achromatic image 118 of the same scene 102 that focuses on capturing luminance rather than chrominance may be less susceptible to such inaccuracies, as the edge geometry may present more significant luminance contrast. Additionally, if the achromatic image 118 is captured with higher resolution, more data may be available that enables a more precise calculation of such edge geometry. However, many compositing techniques utilized by such cameras 104 may not account for such differential accuracy in the achromatic image 118 as compared with the monochromatic images 116. For example, rather than using the more accurate edge details in the achromatic image 118 to detect and reduce the edge inaccuracies in the corresponding pixels of the monochromatic images 116, such compositing techniques may simply factor the corresponding pixels together (e.g., as an arithmetic average). That is, in such other techniques, the adjustment of the monochromatic pixels 204 may only relate to the corresponding achromatic pixel 206, and may obscure, rather than conform with, the edges and edge details that are encoded in the achromatic image 118. Accordingly the inaccuracies in the monochromatic images 116 may persist and appear in the composite image 122.

Presented herein are techniques for generating a composite image 122 composited from one or more monochromatic images 116 and an achromatic image 118 (e.g., a panchromatic image, or an infrared or near-infrared image) that include a reconstruction of edge geometry. In accordance with these techniques, and as further depicted in the exemplary scenario 200 of FIG. 2, it may be appreciated that in the achromatic image 118, an edge 202 may be represented as a gradient 214 of intensity within a neighborhood 212 of the achromatic pixel 206. Accordingly, for each composite pixel 208 in the composite image 122, the corresponding monochromatic pixels 204 of the monochromatic images 116 may be compared not only with the intensity of the corresponding achromatic pixel 206 in the achromatic image 118, but with a gradient 214 of the neighborhood 212 of the achromatic pixel 206 in the achromatic image 118. Moreover, for respective pixels 208 of the composite image 122, an iterative process may be performed to adjust the intensities of the respective corresponding monochromatic pixels 204 of the monochromatic images 116 to reflect the gradient 214 exhibited in the neighborhood 212 of the corresponding achromatic 206 pixel of the achromatic image 118. This iterative processing may be performed a desired number of times (e.g., a fixed number of iterations, or until an adjustment convergence is detected), and the adjusted monochromatic pixels 204 may be factored together to produce the composite pixel 208 of the composite image 122.

Figure 3:
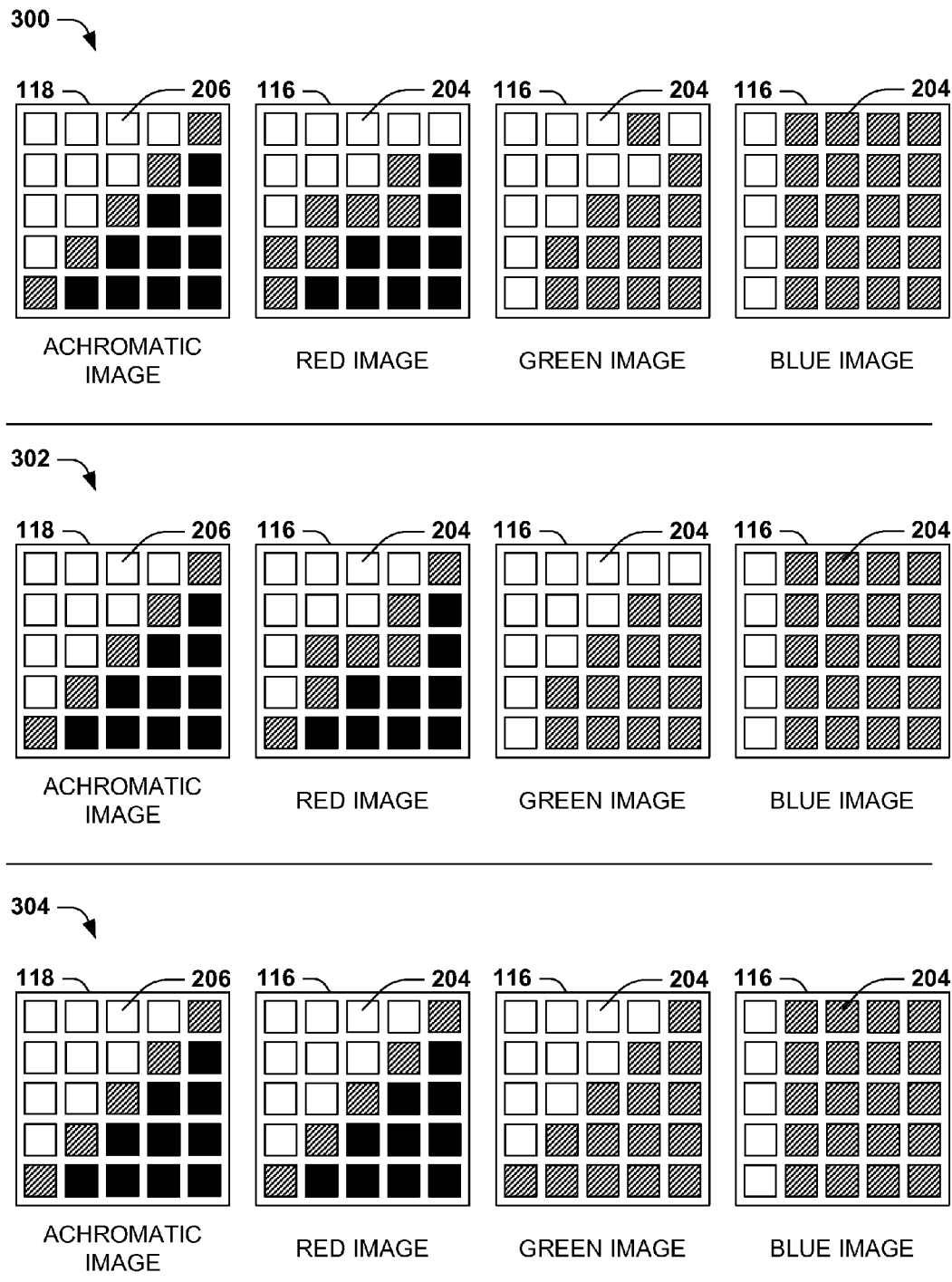
FIG. 3 is an illustration of an exemplary scenario featuring a compositing of a composite image of a scene from a set of monochromatic images and an achromatic image in accordance with the techniques presented herein.

FIG. 3 presents an illustration of an exemplary scenario featuring an exemplary iterative process for adjusting a set of monochromatic pixels 204 to reflect a gradient 214 that is apparent in a neighborhood 212 of the corresponding achromatic pixel 206 of an achromatic image 118. In this exemplary scenario, at a first time 300 (e.g., before iterating), a captured achromatic image 118 may reflect a gradient in intensity representing a visual edge 202 within the scene 102. However, this gradient 214 may be less distinct in respective monochromatic images, including a red image, a green image, and a blue image, due to the comparatively lower magnitude of the contrast in the chrominance channel than the luminance channel. For example, the gradient 214 may be reflected as a transition between a light color and a brown color that is represented as a combination of red and green monochromatic pixels 204, which may be more apparent in the achromatic image 118 than in the individual monochromatic images 116 or the combination thereof. As a result, while the gradient 216 may appear sharp and distinct in the achromatic image 118, visual artifacts may appear along the edge 202 in the red and green monochromatic images 116 (and may not appear in the blue monochromatic image 116 that does not contribute to the gradient 214). In order to reduce such visual artifacts, an iterative adjustment may be applied by incrementally migrating the intensities of the monochromatic pixels 204 toward the gradient 214 in the neighborhood 212 of the achromatic image 118. For example, at a second time point 302 (e.g., following one or more iterations), the monochromatic pixels 204 in each of the red and green image may exhibit a more distinct gradient that matches the gradient 214 of the achromatic image 118; and at a third time point 304 (e.g., at an adjustment convergence of the iterative process), the red monochromatic image 116 and the green monochromatic image 116 may together clearly and consistently depict the gradient 214 reflected in the neighborhood 212 of the achromatic image 118. The resulting adjusted monochromatic images 116 may then be composited to generate a composite image 122 reflecting a reconstruction of the edge geometry captured in the achromatic image 118 in accordance with the techniques presented herein.

C. Exemplary Embodiments

Figure 4:
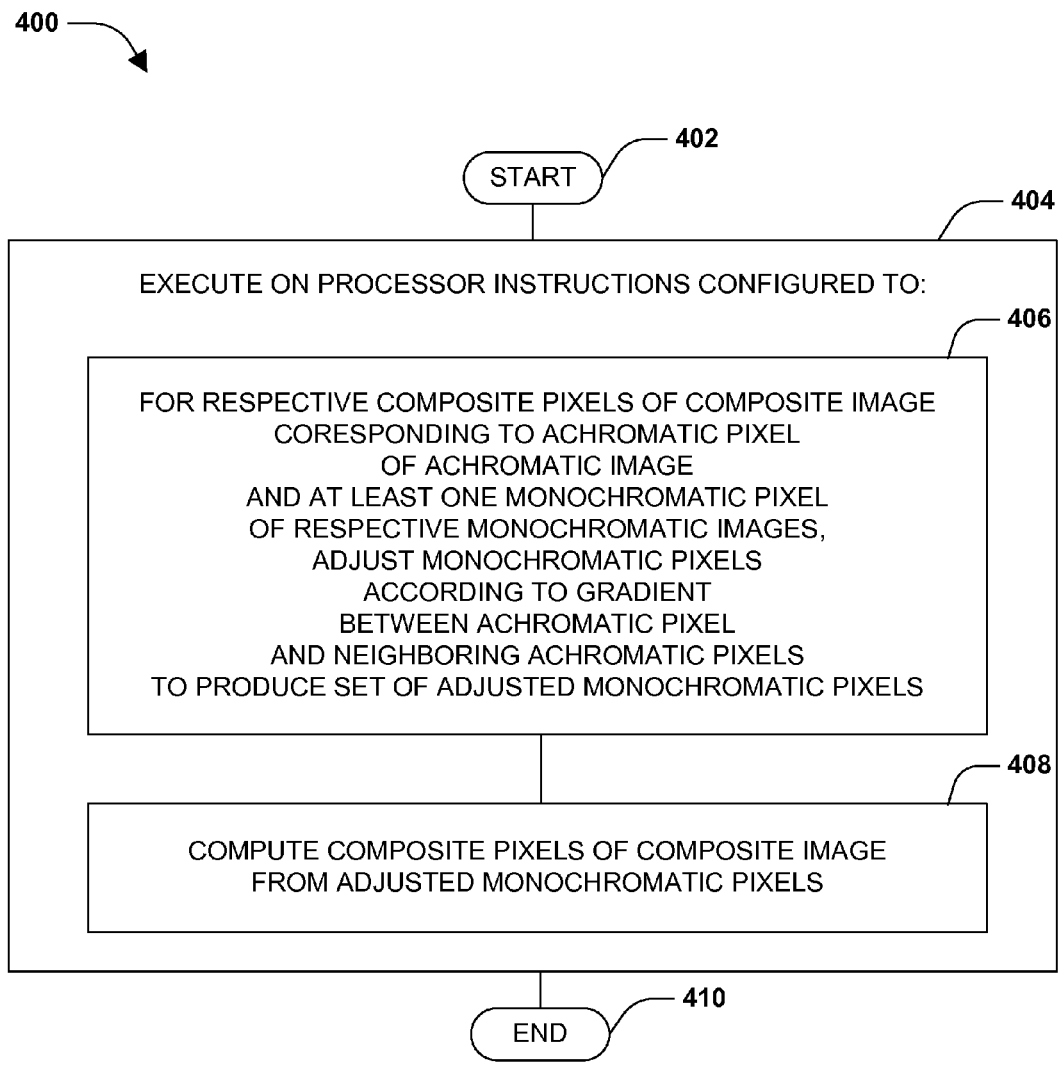
FIG. 4 is an illustration of an exemplary method of generating a composite image of a scene from a set of monochromatic images and an achromatic image in accordance with the techniques presented herein.

FIG. 4 presents a first exemplary embodiment of the techniques presented herein, illustrated as an exemplary method 400 of generating a composite image 122 of a scene 102 from an achromatic image 118 of the scene 102 and at least two monochromatic images 116 of the scene 102. The exemplary method 400 may be implemented, e.g., as a set of instructions stored in a memory component of the device, such as a memory circuit, a platter of a hard disk drive, a solid-state storage device, or a magnetic or optical disc, and organized such that, when executed by the device (e.g., on a processor of the device), cause the device to operate according to the techniques presented herein. The exemplary method 400 begins at 402 and involves executing 404 the instructions on a processor of the device. Specifically, these instructions may be configured to, for respective composite pixels 208 of the composite image 122 corresponding to an achromatic pixel 206 of the achromatic image 118 and at least one monochromatic pixel 204 of respective monochromatic images 116, adjust 406 the monochromatic pixels 204 according to a gradient 214 between the achromatic pixel 206 and neighboring achromatic pixels 206 to produce a set of adjusted monochromatic pixels 204. The instructions are also configured to compute 408 the composite pixels 208 of the composite image 122 from the adjusted monochromatic pixels 204. Having achieved the generation of the composite image 122 by adjusting the monochromatic pixels 204 according to the gradients 214 among neighborhoods 212 of achromatic pixels 206, the exemplary method 400 achieves the techniques presented herein, and so ends at 410.

Figure 5:
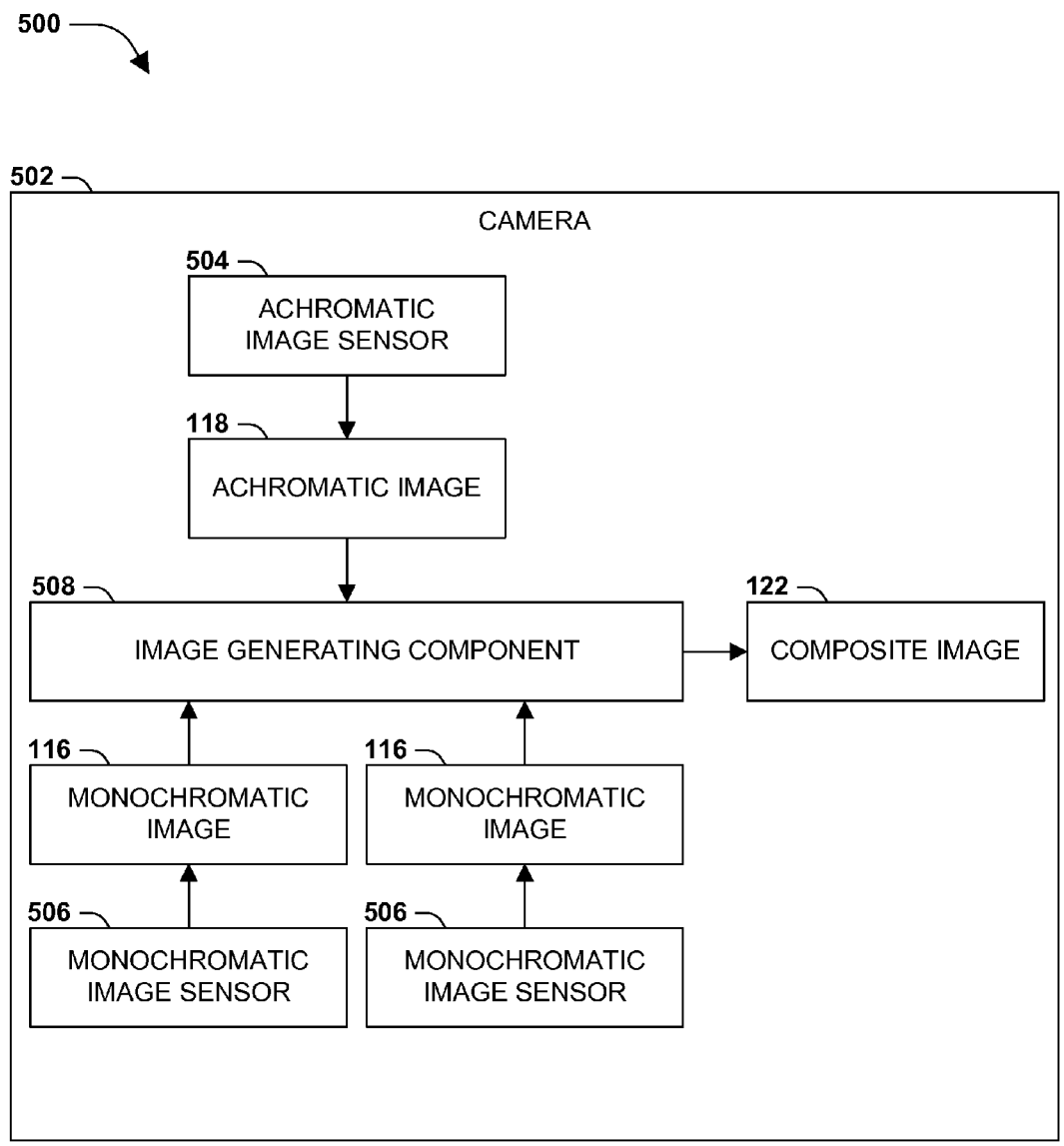
FIG. 5 is a component block diagram illustrating an exemplary camera configured to generate a composite image of a scene from a set of monochromatic images and an achromatic image in accordance with the techniques presented herein.

FIG. 5 presents a second exemplary embodiment of the techniques presented herein, illustrated as an exemplary camera 502 configured to generate a composite image 122 of a scene 102. The camera 502 comprises at least one achromatic image sensor 504 that is configured to capture an achromatic image 118 of the scene 102, and at least two monochromatic image sensors 506 respectively configured to capture, concurrently with the achromatic image 118, a monochromatic image 116 of the scene 102. The exemplary camera 502 also includes an image generating component 508 that is configured to generate a composite image 122 of the scene 102 using the achromatic image 118 and the at least two monochromatic images 116. The image generating component 508 may be implemented, e.g., as a set of instructions stored in a memory of the camera 502 and executable on a processor of the camera 502; a digital logic circuit; a field-programmable gate array (FPGA) configured to express the logic of the techniques provided herein; or any similar architecture or device. More specifically, the image generating component 508 achieves this result by, for respective composite pixels 208 of the composite image 122 corresponding to an achromatic pixel 206 of the achromatic image 118 and at least one monochromatic pixel 204 of respective at least two monochromatic images 116, adjusting the monochromatic pixels 204 according to a gradient 214 between the achromatic pixel 206 and neighboring achromatic pixels 206 of the achromatic image 118 to produce a set of adjusted monochromatic pixels 204; and computing the composite pixels 208 of the composite image 12 from the adjusted monochromatic pixels 204. In this manner, the exemplary camera 502 may generate the composite image 122 from the achromatic image 118 and the at least two monochromatic images 116 in accordance with the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
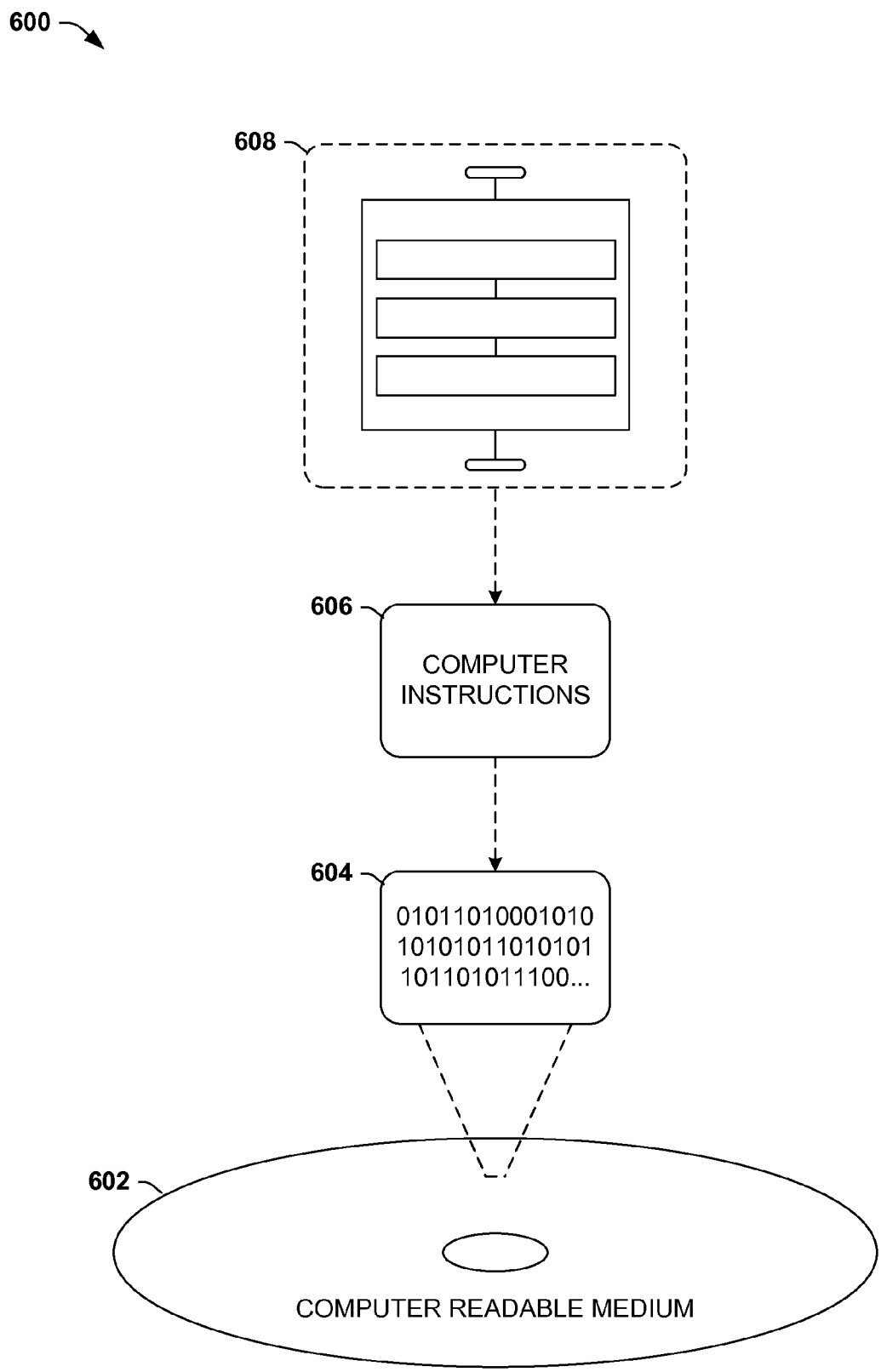
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In a first such embodiment, the processor-executable instructions 606 may be configured to perform a method 608 of generating a composite image 122 from a monochromatic image 118 and at least one monochromatic image 116, such as the exemplary method 400 of FIG. 4. In a second such embodiment, the processor-executable instructions 606 may be configured to implement systems for generating a composite image 122 from a monochromatic image 118 and at least one monochromatic image 116, such as the image generating component 508 in the exemplary camera 502 illustrated in the exemplary scenario 500 of FIG. 5. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4, and/or the exemplary camera 502 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of image processing devices, such as cameras, servers, server farms, workstations, laptops, tablets, mobile phones, game consoles, and network appliances. Such image processing devices may also provide a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components. Additionally, the image processing device may perform the compositing in realtime or near-realtime (e.g., promptly upon capturing the achromatic image 118 and the at least one monochromatic image 116), or may perform the compositing at a later time (e.g., for stored images that were previously captured).

As a second variation of this first aspect, these techniques may be utilized in many types of imaging scenarios involving at least one achromatic image 118 and at least one monochromatic image 116, such as aerial imaging; low-light imaging; underwater imaging; long-exposure imaging, such as astronomical photography; short-exposure imaging; time-lapse imaging; three-dimensional and/or stereoscopic imaging; motion photography, such as video and motion capture imaging; image recognition imaging, such as medical and/or security imaging; machine vision; microscopic imaging, such as electron microscopy; optical character recognition; and gesture recognition.

As a third variation of this first aspect, the monochromatic images 116 may respectively involve data from many monochromatic ranges of the visible or invisible electromagnetic spectrum. Additionally, the monochromatic image sensors 506 may capture the monochromatic images 116 in many ways, such as an array of photosensitive elements 114 that are sensitive only to narrow ranges of the electromagnetic spectrum, and filters positioned between the scene 102 and the image sensor 112.

As a fourth variation of this first aspect, the achromatic image 118 may involve achromatic image types, e.g., data from many ranges of the visible or invisible electromagnetic spectrum. For example, the achromatic image 118 may comprise a panchromatic image representing a panchromatic image type, representing a full-spectrum luminance intensity. Alternatively, the achromatic image 118 may comprise specific visible and/or invisible ranges of the electromagnetic spectrum, such as an infrared image type or a near-infrared image type. That is, the achromatic image 118 may encode or include a chrominance component, but the techniques presented herein may not use the chrominance component in the adjustment of the monochromatic pixels 204. Many such spectral ranges may be captured to generate a suitable achromatic image 118 that exhibits gradients 214 usable to reconstruct edge geometry in the at least one monochromatic image 116. These and other scenarios may be suitable for the application of the techniques presented herein.

D2. Exemplary Adjustment Techniques

A second aspect that may vary among embodiments of these techniques involves the manner of adjusting the monochromatic pixels 204 in view of the gradients 214 exhibited by a neighborhood 212 of the corresponding achromatic pixel 206.

As a first variation of this second aspect, the adjusting may involve various neighborhoods 212 of the achromatic pixel 206. As a first such example, the neighborhood 212 may comprise the directly laterally adjacent set of achromatic pixels 206 (e.g., the two achromatic pixels 206 to the left and right of the selected achromatic pixel 206, and/or the two achromatic pixels 206 above and below the selected achromatic pixel 206). As a second such example, the neighborhood 212 may comprise the laterally and diagonally adjacent achromatic pixels 206 tot the selected achromatic pixel 206 (e.g., a 3×3 grid). As other such examples, the neighborhood 212 may comprise a larger grid (e.g., a 5×5 grid) and/or a differently shaped grid (e.g., a 3×5 grid). As a fourth such example, the gradient 214 may attribute achromatic pixel weights to the neighboring achromatic pixels 206, e.g., based on the magnitude of the gradient 214 (e.g., the difference in luminance intensity between the selected achromatic pixel 206 and the neighboring achromatic pixels 206s) and/or the distance from the selected achromatic pixel 206 to the neighboring achromatic pixel 206. As a fifth such example, gradients 214 may be actively identified in the achromatic image 118 (e.g., using an edge detection technique), and such edges may be used to adjust the monochromatic pixels 204 of respective monochromatic images 116.

As a second variation of this second aspect, the dimensions of the monochromatic images 116 and/or achromatic image 118 may vary, both generally and relative to one another. The adjustment may account for such variable dimensions in various ways. As a first such example, a monochromatic image 116 may have a lower resolution than the composite image 122 to be generated, and respective monochromatic pixels 204 may be factored into more than one composite pixel 208 (e.g., distributing the chrominance of a monochromatic pixel 204 fractionally over at least two composite pixels 208). Conversely, the monochromatic image 116 may have a higher resolution than the composite image 122 to be generated, and at least two monochromatic pixels 204 may be factored into one composite pixel 208 (e.g., averaging the chrominance of such monochromatic pixels 204, optionally with a fractional weight based on the degree of overlap).

As a second example of this second variation, a first monochromatic image 116 may comprise a different number of monochromatic pixels 204 corresponding to a composite pixel 208 than the number of corresponding monochromatic pixels 204 in a second monochromatic image 116. For example, in an exemplary Bayer color filter array, respective composite pixels 208 are computed from a 2×2 block of monochromatic pixels 204 comprising one red monochromatic pixel 204, one blue monochromatic pixel 204, and two green monochromatic pixels 204. In order to factor respective monochromatic pixels 204 proportionately into the composite pixel 208, where at least one selected monochromatic image 116 has at least two monochromatic pixels 204 corresponding to respective composite pixels 208 of the composite image 122 to be generated, the adjustment of the monochromatic pixels 204 may involve adjusting the at least two monochromatic pixels 204 of the selected monochromatic image 116 according to not only the gradient 214 between the achromatic pixel 206 and neighboring achromatic pixels 206 of the neighborhood 212, but also according to a monochromatic pixel weight that is inversely proportional to a count of the monochromatic pixels 204 of the selected monochromatic image 116 corresponding to the composite pixel 208. For example, in monochromatic images 116 captured according to the Bayer color filter with twice as many green pixels, respective green pixels may be factored into the composite pixel 208 with a 50% monochromatic pixel weight as compared with the red monochromatic pixel 204 and the corresponding blue monochromatic pixel 204.

As a third variation of this second aspect, the adjustment of the monochromatic pixels 204 may involve a smoothing weight constant that affects the rate of adjustment of the monochromatic pixels in view of the gradient 214 of the neighborhood 212 of the corresponding achromatic pixel 206. For example, a first smoothing weight may result a more aggressive smoothing that tightly adjusts the monochromatic images 116 toward the gradient 214 of the achromatic image 118, while a second smoothing weight may result in a more gradual and/or conservative smoothing. In addition, it may be advantageous to select the smoothing weight constant in view of various properties of the achromatic image 118 and/or the monochromatic images 116, such as a noise level present in one or several such images. Moreover, in some embodiments, the smoothing weight constant may be selected by a user of a camera 502 or an image processor, while other embodiments may automatically select the smoothing weight constant (e.g., in view of a detected noise level of one or more images).

As a fourth variation of this second aspect, the adjusting may be applied once, or for a specific, selected number of iterations. Alternatively, the adjusting may be iteratively applied until an adjustment convergence is detected, e.g., where a measurement of the adjustment of the monochromatic pixels 204 satisfies a convergence threshold. Such convergence may be detected, e.g. based on the magnitude of the adjustments of the monochromatic pixels 204 in respective iterations, and/or based on a degree of conformity of the monochromatic images 116 and the gradients 214 apparent in the achromatic image 118.

As a fifth variation of this second aspect, the adjusting may be performed according to various calculations. The following mathematical formulae provide some examples of suitable embodiments implementing various aspects and variations of the techniques presented herein.

As a first example of this fifth variation, during respective increments of the adjusting, the monochromatic pixels 204 of respective monochromatic images 116 may be adjusted according to a first mathematical formula comprising:

$$u_p^{t+1} = \frac{dw_p * u_p + \sum_{n \in N_p} sw(p, n) * u_n^t}{dw_p + \sum_{n \in N_p} sw(p, n)}$$

wherein:
t represents an iteration of the iterative adjusting;
p represents respective composite pixels 208;
$u_p$ represents the adjusted monochromatic pixels 204 corresponding to composite pixel p;
$dw_p$ represents a monochromatic pixel weight;
$N_p$ represents a neighborhood 212 of neighboring achromatic pixels of the achromatic pixel 206;
n represents respective neighboring achromatic pixels 206 of the neighborhood 212;
sw(p,n) represents a gradient between the achromatic pixel 206 corresponding to the composite pixel p and respective neighboring achromatic pixels n; and
$u_p^t$ represents the adjusted monochromatic pixels 204 corresponding to the composite pixel p adjusted during iteration t, where a first iteration is computed according to a second mathematical formula comprising:

$$u_p^0 = (i_p - m)$$

wherein:
m represents the achromatic pixel 206 corresponding to the composite pixel p, and
$i_p$ represents respective monochromatic pixels 204 corresponding to the composite pixel p.

As a second example of this fifth variation, the adjustment of the monochromatic pixels 204 of respective monochromatic images 116 may be adjusted according to a third mathematical formula comprising:

$$dw_p = \begin{Bmatrix} \begin{Bmatrix} w_r & \text{if pixel is red} \\ 0 & \text{else} \end{Bmatrix} \\ \begin{Bmatrix} w_g & \text{if pixel is green} \\ 0 & \text{else} \end{Bmatrix} \\ \begin{Bmatrix} w_b & \text{if pixel is blue} \\ 0 & \text{else} \end{Bmatrix} \end{Bmatrix}$$

wherein:
p represents respective composite pixels 208;
$dw_p$ represents the monochromatic pixel weight of respective monochromatic pixels 204;
$w_r$ represents a red monochromatic pixel weight of respective red monochromatic pixels 204 that is inversely proportional to a count of the red monochromatic pixels 204 corresponding to the composite pixel 208;
$w_g$ represents a green monochromatic pixel weight of respective green monochromatic pixels 204 that is inversely proportional to a count of the green monochromatic pixels 204 corresponding to the composite pixel 208; and
$w_b$ represents a blue monochromatic pixel weight of respective blue monochromatic pixels 204 that is inversely proportional to a count of the blue monochromatic pixels 204 corresponding to the composite pixel 208.

As a third example of this fifth variation, the adjustment of the monochromatic pixels 204 may involve calculating the gradient 214 of the neighborhood 212 of the corresponding achromatic pixel 206 and the smoothing weight constant according to a fourth mathematical formula comprising:

$$sw(p, n) = \frac{eps}{eps + (n - m)^2}$$

wherein:
p represents respective composite pixels 208;
m represents the achromatic pixel 206 corresponding to the composite pixel p;
n represents respective neighboring achromatic pixels 206 of the achromatic pixel m; and
eps represents the smoothing weight constant.

As a fourth example of this fifth variation, after completing the adjusting, the composite pixels 208 of the composite image 122 may be computed from the adjusted monochromatic pixels 204 according to a fifth mathematical formula comprising:

$$c_p = (u_p^{t_c} + m)$$

wherein $t_c$ represents a final iteration resulting in an adjustment convergence of the monochromatic pixels 204 (e.g., adding back in the intensity of the achromatic pixel 206 that was removed during the initial iteration). These and other variations and mathematical formulae may be applied to achieve the adjusting of the monochromatic pixels 204 in view of the gradients 214 in the neighborhood 212 of the corresponding achromatic pixel 206 in view of the techniques presented herein.

D3. Composite Image Generation

A third aspect that may vary among embodiments of the techniques presented herein involves the generation of the composite image 122 from the adjusted monochromatic pixels 204.

As a first such variation, in addition to more accurate edge geometry and a reduction of visual artifacts, the techniques presented herein may result in various effects for the composite image 122. As a first such example, the factoring of the monochromatic pixels 204 during these techniques may result in a de-mosaicing of the monochromatic pixels 204 (e.g., factoring a 2×2 cluster of red, green, and blue pixels generated by a Bayer filter array into a full-color composite pixel 208). As a second such example, the adjustment of the monochromatic pixels 204 factored together with the achromatic pixels 206 of a potentially higher-resolution achromatic image 118 may result in a pan-sharpening of the composite image 122.

As a second such variation, various other image processing techniques may be performed before, during, or after the adjusting of the monochromatic pixels 204 and/or the generation of the composite image 122. As one such example, an embodiment may also apply an edge preservation calculation to the composite image 122, such as an anisotropic diffusion edge preservation calculation; a bilateral filtering edge preservation calculation; and/or as vectorial total variation edge preservation calculation. These and other additional calculations and results may result in the composite image 122 generated according to the techniques presented herein.

E. Computing Environment

Figure 7:
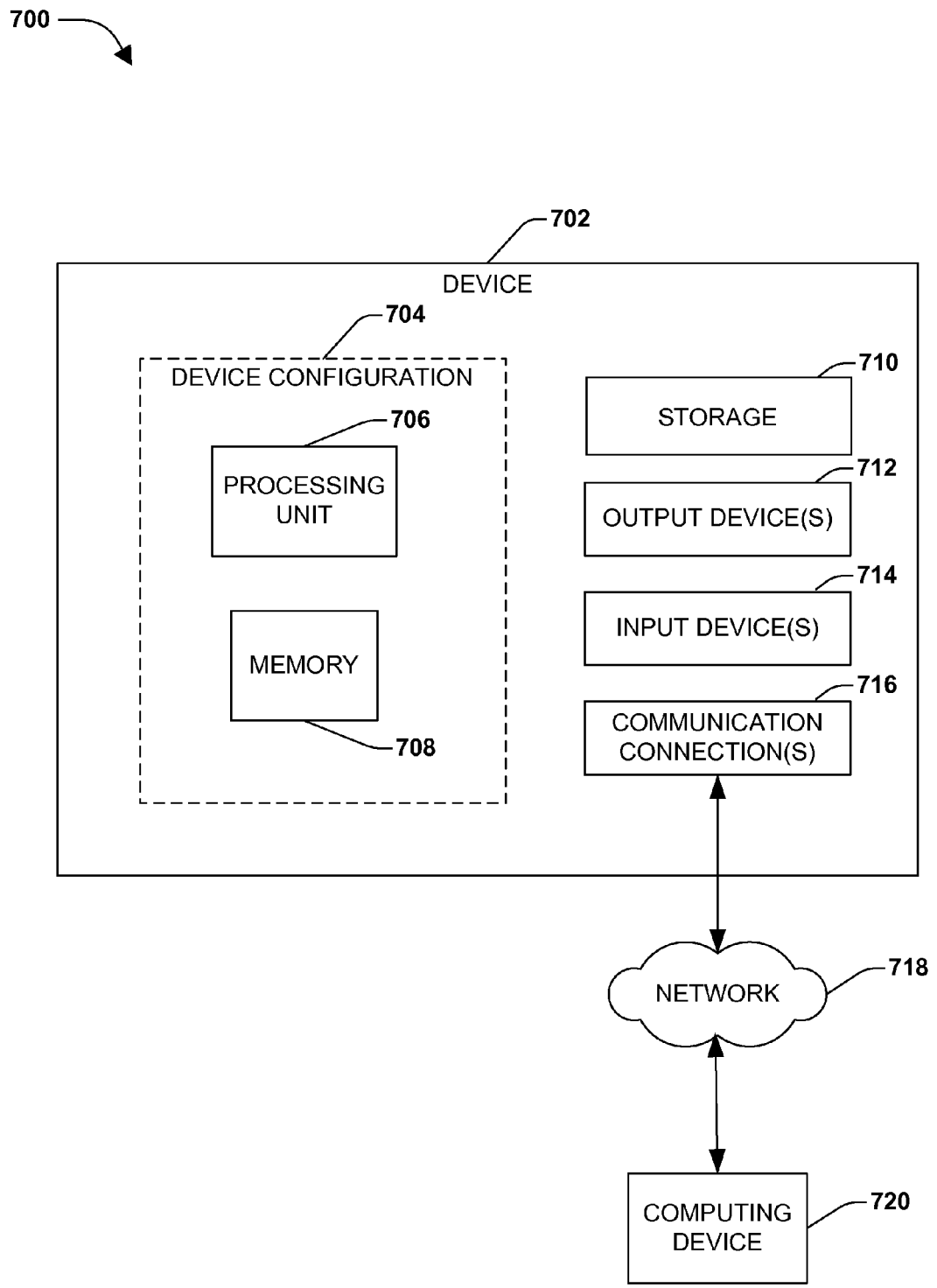
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 702 configured to implement one or more embodiments provided herein. In one configuration, computing device 702 includes at least one processing unit 706 and memory 708. Depending on the exact configuration and type of computing device, memory 708 may be volatile (such as RAM, for example), non-volatile (such as ROM, flash memory, etc., for example) or some combination of the two. This configuration is illustrated in FIG. 7 by dashed line 704.

In other embodiments, device 702 may include additional features and/or functionality. For example, device 702 may also include additional storage (e.g., removable and/or non-removable) including, but not limited to, magnetic storage, optical storage, and the like. Such additional storage is illustrated in FIG. 7 by storage 710. In one embodiment, computer readable instructions to implement one or more embodiments provided herein may be in storage 710. Storage 710 may also store other computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, but is not limited to, a modem, a Network Interface Card (NIC), an integrated network interface, a radio frequency transmitter/receiver, an infrared port, a USB connection, or other interfaces for connecting computing device 702 to other computing devices. Communication connection(s) 716 may include a wired connection or a wireless connection. Communication connection(s) 716 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In one embodiment, an input device or an output device from another computing device may be used as input device(s) 714 or output device(s) 712 for computing device 702.

Components of computing device 702 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 702 may be interconnected by a network. For example, memory 708 may be comprised of multiple physical memory units located in different physical locations interconnected by a network.

Those skilled in the art will realize that storage devices utilized to store computer readable instructions may be distributed across a network. For example, a computing device 720 accessible via network 718 may store computer readable instructions to implement one or more embodiments provided herein. Computing device 702 may access computing device 720 and download a part or all of the computer readable instructions for execution. Alternatively, computing device 702 may download pieces of the computer readable instructions, as needed, or some instructions may be executed at computing device 702 and some at computing device 720.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of generating a composite image of a scene from an achromatic image of the scene and at least two monochromatic images of the scene on a device having a processor, the method comprising:
    executing on the processor instructions configured to
        for at least one composite pixel of the composite image corresponding to an achromatic pixel of the achromatic image and at least one monochromatic pixel of respective monochromatic images, iteratively adjust the at least one monochromatic pixel proportional to a difference between the achromatic pixel and neighboring achromatic pixels to produce at least one adjusted monochromatic pixel in a set of adjusted monochromatic pixels; and
        compute the composite pixels of the composite image from the adjusted monochromatic pixels.

2. The method of claim 1, wherein the instructions are further configured to capture the respective monochromatic images of the scene by applying a monochromatic filter to an image sensor.

3. The method of claim 1, wherein the achromatic image having an achromatic image type selected from an achromatic image type set comprises:
    a panchromatic image type; and
    a near-infrared image type.

4. The method of claim 1, wherein the neighboring achromatic pixels of a selected achromatic pixel comprises the achromatic pixels of the achromatic image that are laterally and diagonally adjacent to the selected achromatic pixel.

5. The method of claim 1, wherein adjusting the monochromatic pixels comprises:
    removing the achromatic pixel from respective monochromatic pixels; and
    after iterative adjustment, adding the achromatic pixel to respective monochromatic pixels.

6. The method of claim 5, wherein the iterative adjusting comprises: applying a selected number of iterations of adjusting the respective monochromatic pixels.

7. The method of claim 5, wherein the iterative adjusting comprises: iteratively adjusting the respective monochromatic pixels until reaching an adjustment convergence of the monochromatic pixels satisfying a convergence threshold.

8. The method of claim 5, wherein the instructions are further configured to:
    iteratively adjust the monochromatic pixels according to a first mathematical formula comprising:

$$u_p^{t+1} = \frac{dw_p * u_p + \sum_{n \in N_p} sw(p, n) * u_n^t}{dw_p + \sum_{n \in N_p} sw(p, n)}$$

wherein:
    t represents an iteration of the iterative adjusting;
    p represents respective composite pixels;
    $u_p$ represents the adjusted monochromatic pixels corresponding to composite pixel p;
    $dw_p$ represents a monochromatic pixel weight;
    $N_p$ represents a neighborhood of neighboring achromatic pixels of the achromatic pixel;
    n represents respective neighboring achromatic pixels of the neighborhood;
    sw(p,n) represents a gradient between the achromatic pixel corresponding to the composite pixel p and respective neighboring achromatic pixels n; and
    $u_p^t$ represents the adjusted monochromatic pixels corresponding to the composite pixel p adjusted during iteration t, where a first iteration is computed according to a second mathematical formula comprising:

$$u_p^0 = (i_p - m)$$

wherein:
    m represents the achromatic pixel corresponding to the composite pixel p, and
    $i_p$ represents respective monochromatic pixels corresponding to the composite pixel p and compute the composite pixels of the composite image from the adjusted monochromatic pixels according to a third mathematical formula comprising:

$$c_p = (u_p^{t_c} + m)$$

wherein $t_c$ represents an iteration resulting in an adjustment convergence of the monochromatic pixels.

9. The method of claim 1, wherein,
at least one selected monochromatic image has at least two monochromatic pixels corresponding to respective composite pixels; and
the adjusting comprising: adjusting the at least two monochromatic pixels of the selected monochromatic image according to the gradient between the achromatic pixel and the neighboring achromatic pixels.

10. The method of claim 9, wherein the adjusting further comprises: adjusting the at least two monochromatic pixels of the selected monochromatic image according to a monochromatic pixel weight that is inversely proportional to a count of the monochromatic pixels of the selected monochromatic image.

11. The method of claim 10, wherein the instructions are further configured to adjust the monochromatic pixels of the selected monochromatic image according to the monochromatic pixel weight according to a mathematical formula comprising:

$$dw_p = \left\{ \begin{array}{l} \left\{ \begin{array}{ll} w_r & \text{if pixel is red} \\ 0 & \text{else} \end{array} \right\} \\ \left\{ \begin{array}{ll} w_g & \text{if pixel is green} \\ 0 & \text{else} \end{array} \right\} \\ \left\{ \begin{array}{ll} w_b & \text{if pixel is blue} \\ 0 & \text{else} \end{array} \right\} \end{array} \right\}$$

wherein:
p represents respective composite pixels;
$dw_p$ represents the monochromatic pixel weight of the monochromatic pixels of respective monochromatic images;
$w_r$ represents a red monochromatic pixel weight of respective red monochromatic pixels that is inversely proportional to a count of the red monochromatic pixels corresponding to the composite pixel;
$w_g$ represents a green monochromatic pixel weight of respective green monochromatic pixels that is inversely proportional to a count of the green monochromatic pixels corresponding to the composite pixel; and
$w_b$ a blue monochromatic pixel weight of respective blue monochromatic pixels that is inversely proportional to a count of the blue monochromatic pixels corresponding to the composite pixel.

12. The method of claim 1, wherein the adjusting further comprises: adjusting the monochromatic pixels according to the gradient between the achromatic pixel and the achromatic pixels of neighboring achromatic pixels and a smoothing weight constant.

13. The method of claim 12, wherein the instructions are further configured to select the smoothing constant in view of a noise level of the achromatic image.

14. The method of claim 12, wherein the instructions are further configured to adjust the monochromatic pixels according to the gradient between the achromatic pixel and the achromatic pixels of neighboring achromatic pixels and the smoothing weight constant according to a mathematical formula comprising:

$$sw(p, n) = \frac{eps}{eps + (n - m)^2}$$

wherein:
p represents respective composite pixels;
m represents the achromatic pixel corresponding to the composite pixel p;
n represents respective neighboring achromatic pixels of the achromatic pixel m; and
eps represents the smoothing weight constant.

15. The method of claim 1, wherein computing the composite pixels comprises de-mosaicing the composite pixels from the adjusted monochromatic pixels.

16. The method of claim 1 wherein;
the achromatic comprises at least two achromatic pixels corresponding to respective monochromatic pixels; and
computing the composite pixels comprises pan-sharpening the composite pixels from the adjusted monochromatic pixels and the achromatic pixels.

17. The method of claim 1, wherein the instructions are further configured to apply an edge preservation calculation to the composite image.

18. The method of claim 17, wherein the edge preservation calculation is selected from an edge preservation calculation set comprising:
an anisotropic diffusion edge preservation calculation;
a bilateral filtering edge preservation calculation; and
a vectorial total variation edge preservation calculation.

19. A camera, comprising:
an achromatic image sensor configured to capture an achromatic image of a scene;
at least two monochromatic image sensors respectively configured to capture, concurrently with the achromatic image, a monochromatic image of the scene; and
an image generating component configured to generate a composite image of the scene by:
for respective composite pixels of the composite image corresponding to an achromatic pixel of the achromatic image and at least one monochromatic pixel of respective monochromatic images, adjusting the monochromatic pixels according to a gradient between the achromatic pixel and neighboring achromatic pixels to produce a set of adjusted monochromatic pixels; and
computing the composite pixels of the composite image from the adjusted monochromatic pixels.

20. A nonvolatile computer-readable storage device comprising instructions that, when executed on a processor of a device, generate a composite image of a scene from an achromatic image of the scene and a set of monochromatic images of the scene by:
for respective composite pixels of the composite image corresponding to an achromatic pixel of the achromatic image and at least one monochromatic pixel of respective monochromatic images, adjusting the at least one monochromatic pixels according to a gradient between the achromatic pixel and neighboring achromatic pixels to produce a set of adjusted monochromatic pixels, wherein the neighboring achromatic pixels comprise achromatic pixels of the achromatic image that are laterally and diagonally adjacent to the selected achromatic pixel; and
compute the composite pixels of the composite image from the adjusted monochromatic pixels.

* * * * *